(No Model.)

J. W. HERSHBERGER.
CATCH BASIN FOR SEWERS.

No. 462,864.  Patented Nov. 10, 1891.

Witnesses:
Christopher Wren
O. M. Lance

Inventor.
Joseph W. Hershberger

UNITED STATES PATENT OFFICE.

JOSEPH W. HERSHBERGER, OF PLYMOUTH, PENNSYLVANIA.

CATCH-BASIN FOR SEWERS.

SPECIFICATION forming part of Letters Patent No. 462,864, dated November 10, 1891.

Application filed June 15, 1891. Serial No. 396,338. (No model.)

*To all whom it may concern:*

Be it known that I, JOSEPH W. HERSHBERGER, a citizen of the United States, residing at Plymouth, in the county of Luzerne and State of Pennsylvania, have invented certain new and useful Improvements in Catch-Basins for Sewers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in catch-basins for sewers; and it consists in certain novel features hereinafter described and claimed.

Figure 1:
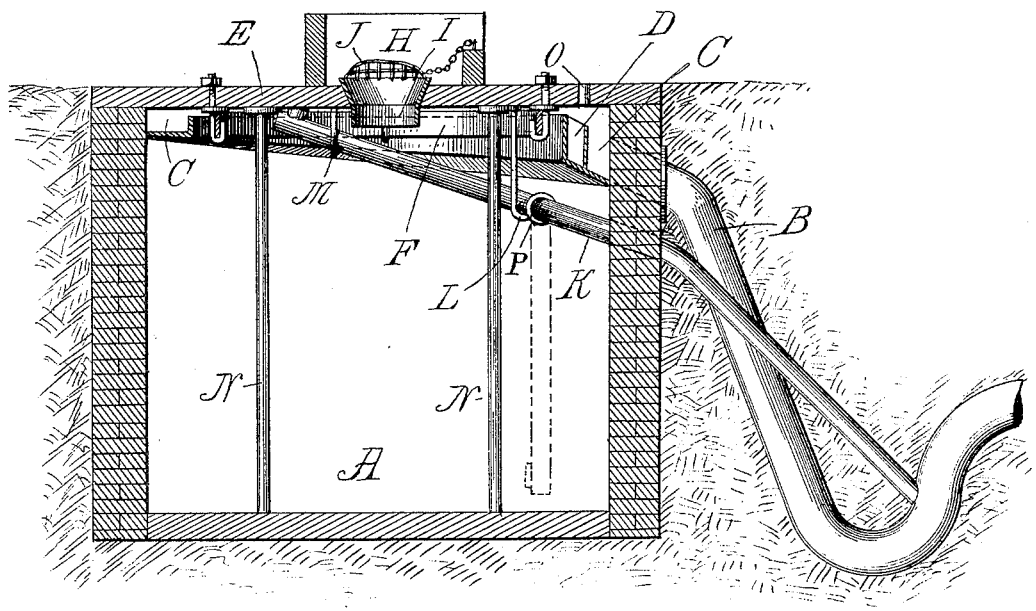
Figure 2:
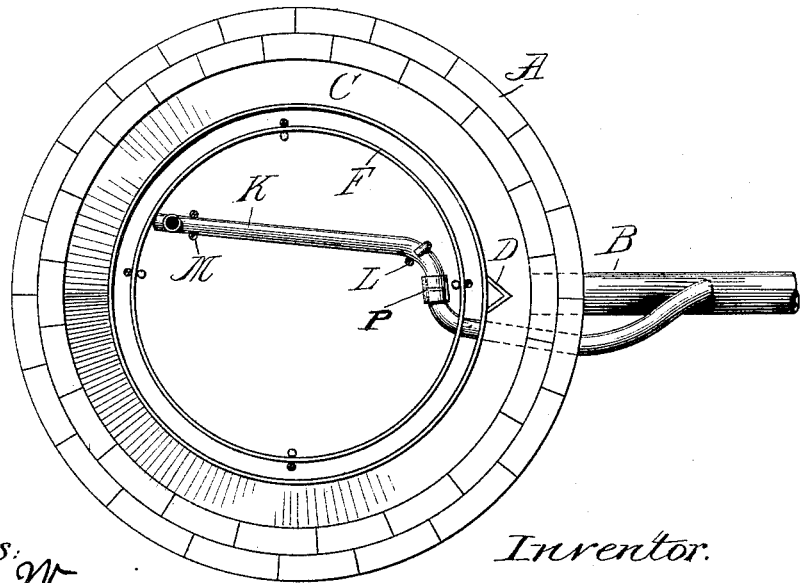

In the annexed drawings, which fully illustrate my invention, Figure 1 is a view of my basin in vertical section, and Fig. 2 is a plan view thereof with top removed.

Referring to the drawings by letter, A designates the pit, which is constructed of brick or stone and may be of any desired size, and B is a discharge-spout leading from the side of the same at a point near the top thereof to the sewer-main.

In the upper edge of the wall of the pit I construct a gutter C, the floor of which is inclined from a point directly opposite the mouth of the discharge spout or pipe to the said mouth, so as to direct the water in the gutter into the said discharge-pipe, as will be readily understood.

On the inner wall of the gutter, just in front of the mouth of the discharge-pipe, I form a partition or deflector D, which turns the water into the said pipe and thereby prevents the same from being clogged up by the water collecting and eddying at that point.

The top E of the pit is constructed of stone or brick, and on the under side of the top I provide a rim or ring F, which is arranged concentrically within the gutter and adjacent thereto. The purpose of this ring will appear presently. The entrance for the water is at the center of the top, as shown at H, and the curbstone is built around the entrance in the usual manner.

Within the entrance I arrange a short vertical tube I to check the current of the water, that it may enter the basin vertically, thereby insuring the equal distribution of the water to all parts of the basin, and in the said tube I provide the screen J to prevent large sticks and other similar substances from passing into the pit.

Within the pit and held normally on the under side of the top or cover is a siphon-tube K, which is composed of two members, the upper member being held to the cover by the hooks L M and the lower member being extended through the wall of the pit and having its lower end connected to and forming a communication with the discharge-pipe. The two members are connected by a brass union or hinge joint $p$, so that the upper member may be lowered to the bottom of the pit when it is desired to draw off the water to permit the pit to be cleaned. The outer hook M may be readily turned to permit the pipe or tube to fall, as when the tube is held in its raised position it will have an outward and upward incline, and consequently when the hook is turned its point will easily pass over the tube. The opening in the lower end of the tube is in the upper side of the same, so that the water will be permitted to pass into the tube without carrying the sediment thereinto.

N N designate supporting rods or braces arranged in the pit and aiding to support the top or cover.

O is an opening in the top to facilitate the inspection of the interior of the pit.

The operation and advantages of the device are thought to be apparent. The water passes through the entrance into the pit and naturally falls to the bottom. As the outlet is near the top of the pit, the water will be forced to remain in the same until it has passed the level of the gutter and will then overflow into the said gutter and thence pass into the discharge-pipe. By this arrangement all the sediment in the water will be collected in the bottom of the pit and will be prevented from passing into the sewer and choking the same. The force of the current will be broken up and distributed, so that the sediment will have no barrier to its settling, and the flow of the water from the pit will be maintained by reason of the inclined bottom of the gutter. The ring on the under side of the top or cover prevents any floating sediment from passing into the discharge-pipe, and consequently the sewer will be unobstructed at all times. When it is desired to remove the sediment from the pit, the inlet-tube is removed from the entrance and the outer hook is turned, so as to permit the siphon to fall into its operative position. The water will then pass off, after which the siphon is turned upward and secured and the sediment then shoveled from the pit in the usual manner.

It will be seen from the foregoing description, taken in connection with the accompanying drawings, that I have produced a catch-basin for sewers by the use of which the sewers will be kept clear and free of obstructions at all times and all sediment positively removed from the water.

Having thus described my invention, what I claim, and desire to secure by Letters Patent, is—

1. A catch-basin for sewers, having a gutter in its wall at its upper end, provided with an inclined floor, and a discharge-pipe leading from the lowest point of the floor of said gutter.

2. A catch-basin for sewers, having a gutter in its wall near the upper end of the same and a ring on the under side of its top arranged concentrically within the said gutter.

3. A catch-basin for sewers, having a discharge-pipe leading from its side near the top thereof and provided with a siphon having one member normally held on the under side of its top and its other member passing through the side of the basin and connecting with the discharge-pipe, and a hinge-joint connecting the members of the siphon.

In testimony whereof I affix my signature in presence of two witnesses.

JOSEPH W. HERSHBERGER.

Witnesses:
CHRISTOPHER WREN,
O. M. LANCE.